United States Patent
Gille et al.

(10) Patent No.: US 6,460,914 B2
(45) Date of Patent: Oct. 8, 2002

(54) ASSEMBLY OF BODYWORK PARTS, AT LEAST ONE OF THEM INCLUDING AN OVERMOLDED FILM

(75) Inventors: Denis Gille, Oyonnax; Fabien Delwal, Bourg-en-Bresse, both of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/902,268

(22) Filed: Jul. 11, 2001

(65) Prior Publication Data

US 2002/0011741 A1 Jan. 31, 2002

(30) Foreign Application Priority Data

Jul. 13, 2000 (FR) .............................. 00 09236

(51) Int. Cl.$^7$ ................................................. B60J 1/00
(52) U.S. Cl. .................... 296/180.1; 296/901; 296/191; 293/128
(58) Field of Search .............................. 296/180.1, 191, 296/901; 293/120, 128; 144/348

(56) References Cited

U.S. PATENT DOCUMENTS

| 3,709,770 | A |   | 1/1973  | Hale |           |
|-----------|---|---|---------|------|-----------|
| 4,387,125 | A | * | 6/1983  | Adell | ........................ 293/128 |
| 4,429,013 | A | * | 1/1984  | Adell | ........................ 293/128 |
| 4,572,558 | A | * | 2/1986  | Chupick | ..................... 293/128 |
| 4,758,034 | A | * | 7/1988  | Ghezzi et al. | ........... 296/180.1 |
| 5,044,688 | A |   | 9/1991  | Jacobson |        |
| 5,228,742 | A | * | 7/1993  | Johnson et al. | ............. 296/191 |
| 5,229,175 | A | * | 7/1993  | Seabolt | ........................ 293/128 |
| 5,320,151 | A |   | 6/1994  | Wumer |           |
| 5,550,182 | A | * | 8/1996  | Ely et al. | ..................... 524/388 |
| 5,658,041 | A | * | 8/1997  | Girardot et al. | ............ 296/901 |
| 5,688,021 | A | * | 11/1997 | Tomforde et al. | ........... 296/191 |
| 5,830,559 | A | * | 11/1998 | Goldbach et al. | ........... 296/191 |
| 5,960,527 | A |   | 10/1999 | Ellison et al. |          |
| 6,126,877 | A | * | 10/2000 | Gille et al. | ................. 264/138 |
| 6,168,742 | B1 | * | 1/2001 | Yamamoto | .................. 264/266 |
| 6,273,496 | B1 | * | 8/2001 | Guyomard et al. | ......... 296/901 |
| 6,299,244 | B1 | * | 10/2001 | Tarahomi | ..................... 296/191 |
| 6,322,115 | B1 | * | 11/2001 | Devilliers | .................... 293/120 |
| 6,349,987 | B1 | * | 2/2002 | Boulbon | ..................... 296/191 |

FOREIGN PATENT DOCUMENTS

| DE | 3238651 A1 | * | 4/1984  |
|----|------------|---|---------|
| EP | 0 670 257 A1 |   | 9/1995  |
| EP | 0887564 A1 | * | 6/1998  |
| FR | 1604970    | * | 6/1972  |
| JP | 55 148656  | * | 11/1980 |
| JP | 56 21974   | * | 2/1981  |
| JP | 59 128064  | * | 7/1984  |
| JP | 62 152920  | * | 7/1987  |
| WO | WO 94/03337 |   | 2/1994  |

* cited by examiner

Primary Examiner—Kiran Patel
(74) Attorney, Agent, or Firm—Oliff & Berridge, PLC

(57) ABSTRACT

An assembly made up of at least two motor vehicle bodywork parts, including a base part having an outside face carrying an overmolded film with an edge, wherein said base part is partly covered by one or more masking pieces, in particular trim, arranged in such a manner as to mask at least a portion of the edge of the film of the base part.

16 Claims, 3 Drawing Sheets

ASSEMBLY OF BODYWORK PARTS, AT LEAST ONE OF THEM INCLUDING AN OVERMOLDED FILM

The present invention relates to manufacturing bodywork parts for a motor vehicle.

More particularly, the invention relates to an assembly made up of at least two bodywork parts, including a part with an overmolded film on an outside face.

BACKGROUND OF THE INVENTION

The use of bodywork parts with overmolded films is becoming more widespread, the advantage of such parts being that they do not need to be painted.

Furthermore, the film has better scratch resistance than does paint.

The film is generally preshaped prior to being put into place in a mold, thus enabling the film to match the shape of the mold.

To overmold the film, the film is put into place in the mold, optionally together with the preform, and then thermostatic material is injected into the mold.

For reasons of appearance, either the film is cut out accurately so as to present an edge that is regular, or else the edge of the part is made as an undercut so as to hide the edge of the film, in which case the edge of the film can be irregular.

It is quite difficult to cut the film accurately, and the presence of an undercut edge makes the unmolding operation more complicated.

OBJECTS AND SUMMARY OF THE INVENTION

An object of the present invention is to simplify the manufacture of bodywork parts including an overmolded film.

The invention achieves this by means of a novel assembly made up of at least two motor vehicle bodywork parts, including a base part having an outside face carrying an overmolded film with an edge, wherein said base part is partly covered by one or more masking pieces, in particular trims, arranged in such a manner as to mask at least a portion of the edge of the film of the base part.

By means of the invention, the base part including the overmolded film is made easier to manufacture since it is not necessary to make an undercut edge, nor is it necessary to cut the film very accurately.

In particular, the base part can have a draft or tapering edge or the like and the film can have an irregular edge, with the irregularity being masked by the masking piece(s) covering the base part.

In a particular embodiment, the masking piece(s), which can have some function other than that of masking the edge of the film, can be arranged to cover the base part completely in those regions of its outside face that are not covered by the film.

The base part and the masking pieces can be shaped and assembled together in such a manner as to form a visible outside surface that is substantially continuous, which can be preferable from the point of view of appearance.

In a particular embodiment, the base part has a step in which at least a portion of the edge of the film is situated, the depth of the step corresponding substantially to the thickness of the margin(s) of the masking piece(s) covering said base part.

The masking piece(s) can constitute fenders and/or peripheral trim or indeed other bodywork parts.

In a particular embodiment, the base part constitutes at least one shield and the assembly has at least one masking piece constituting a trim that runs along at least the bottom edge of the shield.

The trim can extend into the wheel arch region.

In a particular embodiment, the base part can have two co-molded portions using different materials, and the junction between said two portions is covered at least partly and preferably completely by the masking piece(s).

Thus, the masking piece(s) can simultaneously mask the edge of the film and also the junction between the various materials constituting the co-molded part.

One of the two co-molded portions can constitute a shield and the other a spoiler.

Advantageously, the two co-molded portions together form a setback where they join, which setback is shaped to receive one or more masking pieces.

When the base part has traces of injection points, these traces are preferably located so that they are covered by the masking piece(s).

The base part can be made of a thermoplastic material that is translucent or transparent, and the film can be cut out in such a manner as to define at least one region that the film does not cover so as to form a glass for a lighting device.

When the base part is obtained by co-molding different materials, at least one of the materials can be a translucent or transparent thermoplastic material and the film can be cut out in such a manner as to cover only part of said material so as to leave at least one region that is uncovered and that constitutes a glass for a lighting device.

BRIEF DESCRIPTION OF THE DRAWINGS

Other characteristics and advantages of the present invention will appear on reading the following detailed description of non-limiting embodiments, and on examining the accompanying drawings, in which.

MORE DETAILED DESCRIPTION

Figure 1:
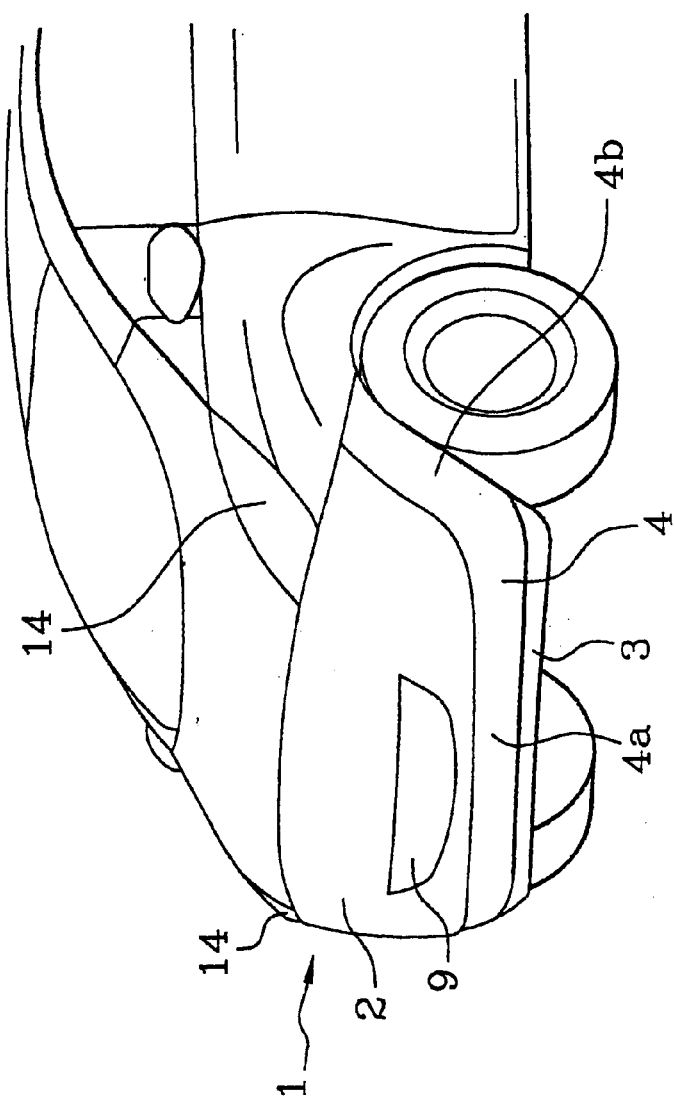
FIG. 1 is a diagrammatic perspective view of the front portion of a motor vehicle including an assembly of bodywork parts constituting a first embodiment of the invention.

FIG. 1 shows the front portion of a motor vehicle comprising an assembly 1 of bodywork parts in accordance with the invention.

The assembly 1 comprises a bumper shield 2, a spoiler 3, and trim 4 that is fixed on the shield 2.

In this case, the shield 2 is co-molded with the spoiler 3, and together they constitute a base part in the meaning of the invention.

The trim 4 constitutes a masking piece.

In the example described, the shield 2 is provided with an air inlet 9 and is made in a relatively rigid material, while the spoiler 3 is made in a material that is more flexible.

Figure 3:
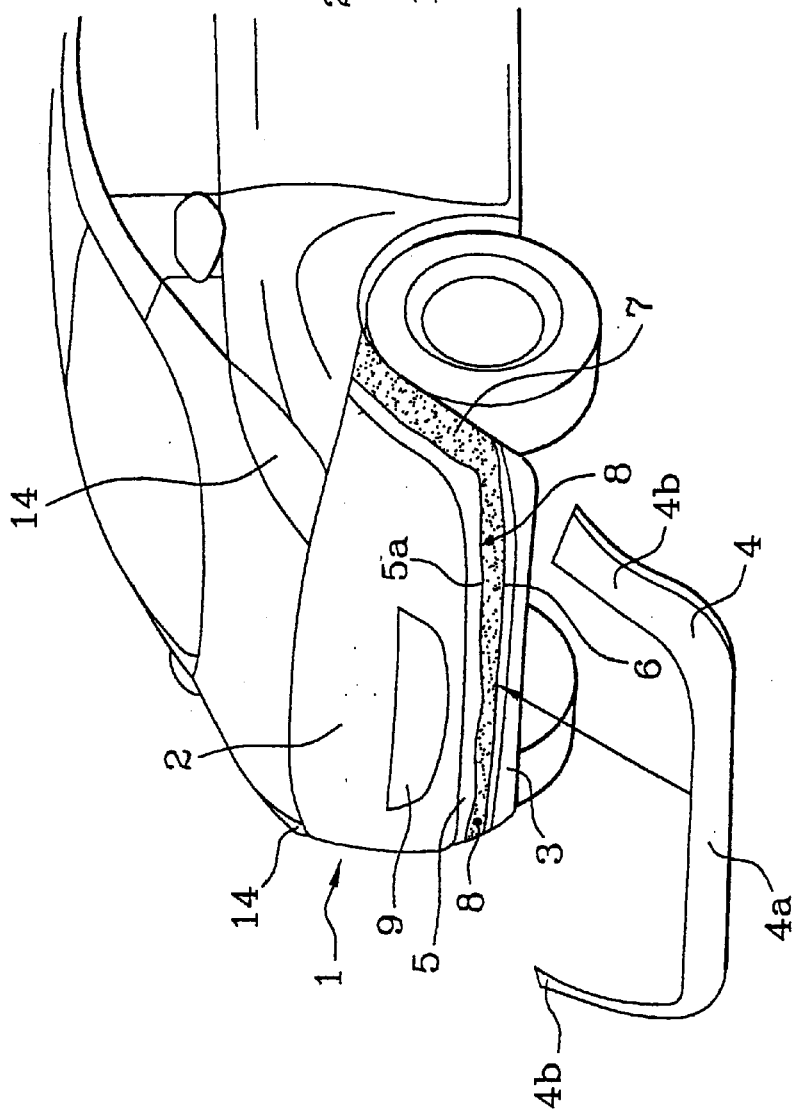
FIG. 3 is a diagrammatic perspective view of the front portion of the FIG. 1 motor vehicle prior to mounting a piece of trim.

As can be seen in particular in FIG. 3, the shield 2 has an overmolded film 5.

During manufacture of the part constituting the shield 2 and the spoiler 3, the film 5 is put into place in a mold and then has the thermoplastic material of the shield 2 overmolded thereon.

The film 5 is preferably preshaped before it is placed in the mold.

The film 5 makes it possible to eliminate the operation of painting the shield 2, and it presents high resistance to scratching.

In the example described, the spoiler 3 has no overmolded film.

In a variant, the spoiler 3 could include an overmolded film, different from the film 5 covering the shield 2.

The shield 2 has a step 7 which extends over its entire bottom portion and up a certain height as far as the wheel arches.

Together with a corresponding step in the top portion of the spoiler 3, the step 7 of the shield 2 forms a setback 6 extending over the entire width of the vehicle.

The edge 5a of the film 5 covering the shield 2 lies on the step 7.

The trim 4 overlies the step 7 so as to mask the edge 5a of the film, in particular.

The trim 4 has a bottom portion 4a and two side portions 4b which are engaged in the setback 6.

Figure 2:
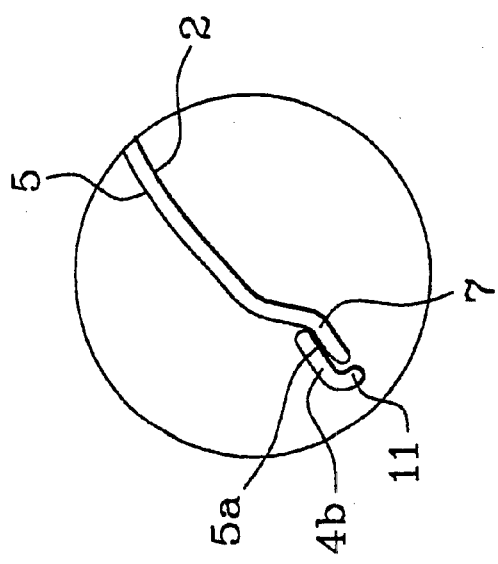
FIG. 2 is a diagrammatic section view of two parts of the FIG. 1 assembly.

The section of FIG. 2 shows the shield 2 and the trim 4 where they are assembled together at the wheel arches.

Each side portion 4b of the trim 4 has an edge remote from the shield 2 forming a rim 11 that is directed rearwards for reasons of appearance and of safety.

The thickness of the trim 4 corresponds substantially to the depth of the setback 6 so as to give the outside surface of the assembly 1 the appearance of continuity, without any step.

As can be seen in FIG. 3, the assembly constituted by the shield 2 and the spoiler 3 has visible traces 8 of thermoplastic material injection.

These traces 8 lie in the bottom of the setback 6 and they are therefore masked by the trim 4 once it is in place.

The shield 2 can be made of a thermoplastic material that is transparent or otherwise.

Nevertheless, it can be advantageous to make all or part of the shield out of a thermoplastic material that is transparent or translucent so as to provide one or more "glasses".

Figure 4:
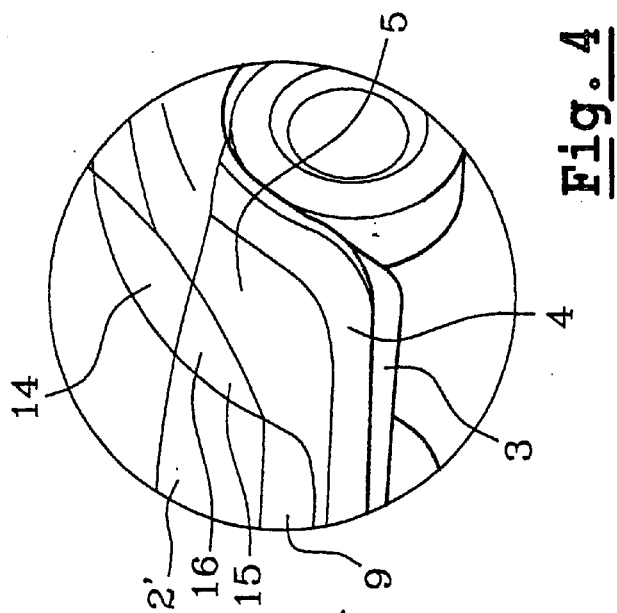
FIG. 4 shows a variant embodiment of the FIG. 1 assembly.

For example, FIG. 4 shows a shield 2' covering lighting devices 15, e.g. direction indicator lights.

The vehicle also has lighting devices 14 in the hood 22 where it is not covered by the shield 2', e.g. headlights.

The shield 2' differs from the shield 2 described above by the fact that it has a translucent region 16 that is not covered by the film 5 so as to form a glass overlying each lighting device 15.

This region 16 is obtained by co-molding using a translucent material, with the remainder of the shield being made out of an opaque material.

The translucent thermoplastic material in each region 16 of the shield 2' is slightly covered by the film 5 so as to give it a clean outline.

In a variant, the shield 2' can be made entirely out of a translucent thermoplastic material, with the film 5 being cut out in such a manner as to avoid covering the translucent material wherever a glass needs to be provided.

The base part and the other parts of the assembly can be given yet further shapes, without going beyond the ambit of the present invention.

Figure 5:
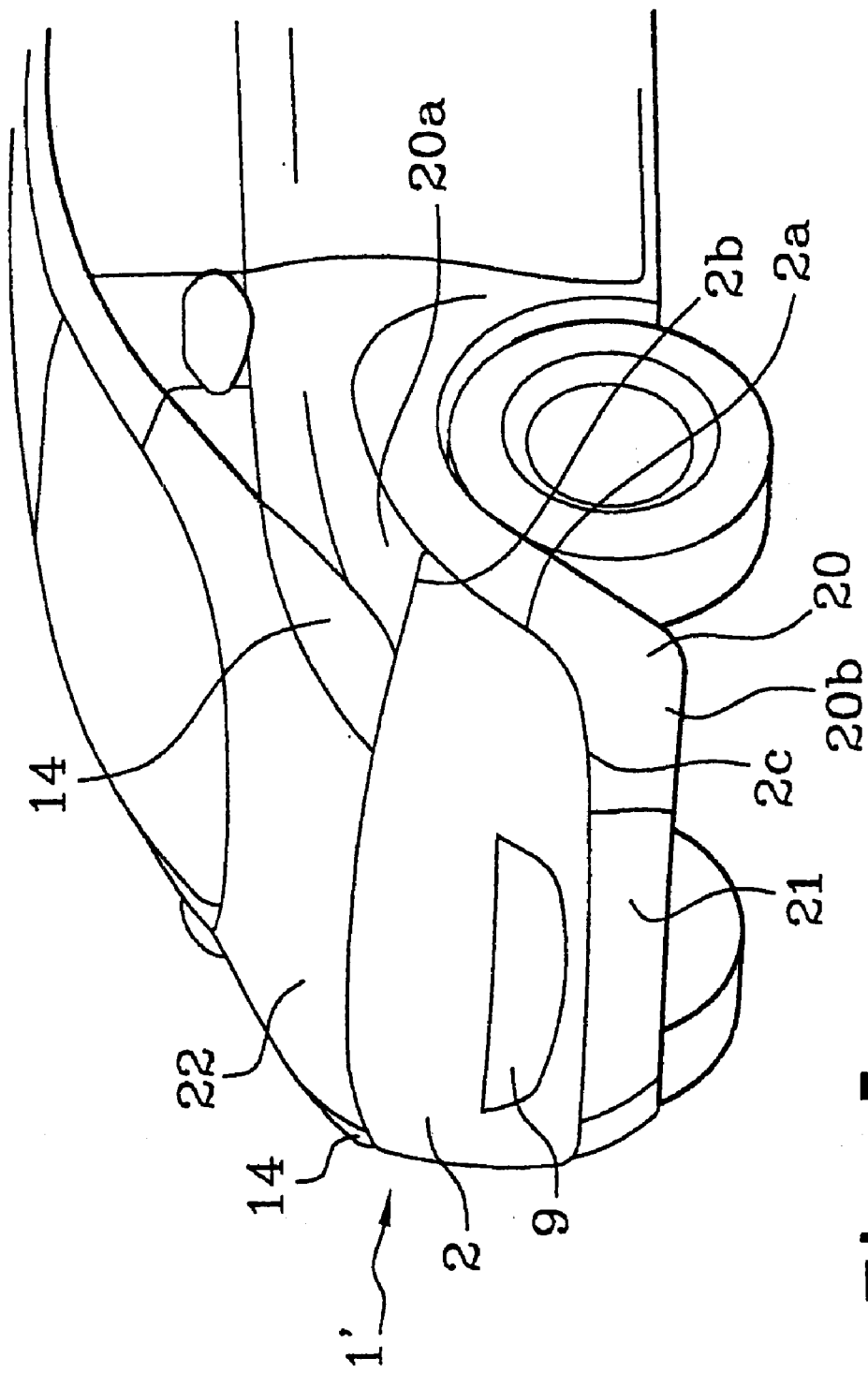
FIG. 5 is a diagrammatic perspective view of the front portion of a motor vehicle including an assembly of bodywork parts constituting a second embodiment of the invention.

By way of example, FIG. 5 shows an assembly 1' of bodywork parts comprising in particular the above-described shield 2, in this case masked at it's periphery by two side portions 20, and peripheral trim 21.

The side portions 20 and the peripheral trim 21 constitute masking pieces in the meaning of the invention.

Each side portion forms a fender 20a and is adjacent to a side region 2a of the shield 2 and also to the top region 2b thereof.

Each side portion 20 also has a front bend 20b bordering a bottom region 2c of the shield 2 adjacent to its side region 2a.

The peripheral trim 21 borders the bottom of the shield 2 between its side portions 20.

After the parts have been assembled together, all of the regions that are not covered by the film 5 are masked by the side portions 20, and the peripheral trim 21, the hood 22, and the lighting devices 14.

In the examples described, the various base parts and masking pieces are held in their final relative positions by conventional fixing means.

Naturally, the invention is not limited to the embodiments described above.

For example, it is possible to assemble together bodywork parts comprising the rear shield of the vehicle as the base part and the rear fenders as the masking pieces, in particular.

It is also possible to make an assembly of parts comprising the top portion of a vehicle door as the base part and its bottom capping as the masking piece.

What is claimed is:

1. An assembly made up of at least two motor vehicle bodywork parts, including a base part having an outside face carrying an overmolded film with an edge, and at least one masking piece partly covering said base par to mask at least a portion of the edge of the film of the base part.

2. An assembly according to claim 1, wherein the at least one masking piece is arranged to totally cover exposed regions of the outside face of the base part that are not covered by the film.

3. An assembly according to claim 1, wherein the base part and the masking pieces are shaped and assembled together in such a manner as to form a visible outside surface that is substantially continuous.

4. An assembly according to claim 1, wherein the base part has a step in which at least a portion of the edge of the film is situated, the depth of the step corresponding substantially to the thickness of a margin of the at least one masking piece that overlies said base part.

5. An assembly according to claim 1, wherein the edge of the film is set back from the edge of the base part.

6. An assembly according to claim 1, wherein said masking pieces constitute fenders.

7. An assembly according to claim 1, wherein the base part constitutes at least one shield, and wherein the assembly includes a masking piece constituting a trim bordering at least the bottom of the shield.

8. An assembly according to claim 7, wherein the trim extends into a wheel arch region.

9. An assembly according to claim 1, wherein the base part comprises two portions co-molded out of different materials, and wherein the junction between these two portions is covered, at least in part, by the at least one masking piece.

10. An assembly according to claim 9, wherein one of said portions constitutes a shield and the other a spoiler.

11. An assembly according to claim 10, wherein said portions together form a setback where they join, shaped so as to receive said at least one masking piece.

12. An assembly according to claim 1, wherein the base part includes traces of material injection points, and the at least one masking piece covers said traces.

13. An assembly according to claim 1, wherein the base part is made of one of translucent and transparent thermoplastic material, and wherein the film is cut out to define at least one exposed region that the film does not cover so as to form a glass for a lighting device.

14. An assembly according to claim 1, wherein the base part is obtained by co-molding different materials, at least one of said materials being one of a translucent and a transparent thermoplastic material, and wherein the film is cut to cover said material in part only so as to leave at least one uncovered region to constitute a glass for a lighting device.

15. An assembly according to claim 1, wherein the at least one masking piece is a trim piece.

16. An assembly according to claim 9, wherein the junction is totally covered.

* * * * *